Dec. 8, 1936. W. H. TRY 2,063,474
APPARATUS FOR TESTING THE ACCURACY OF TOOTHED GEARS
Filed July 19, 1934 2 Sheets-Sheet 1
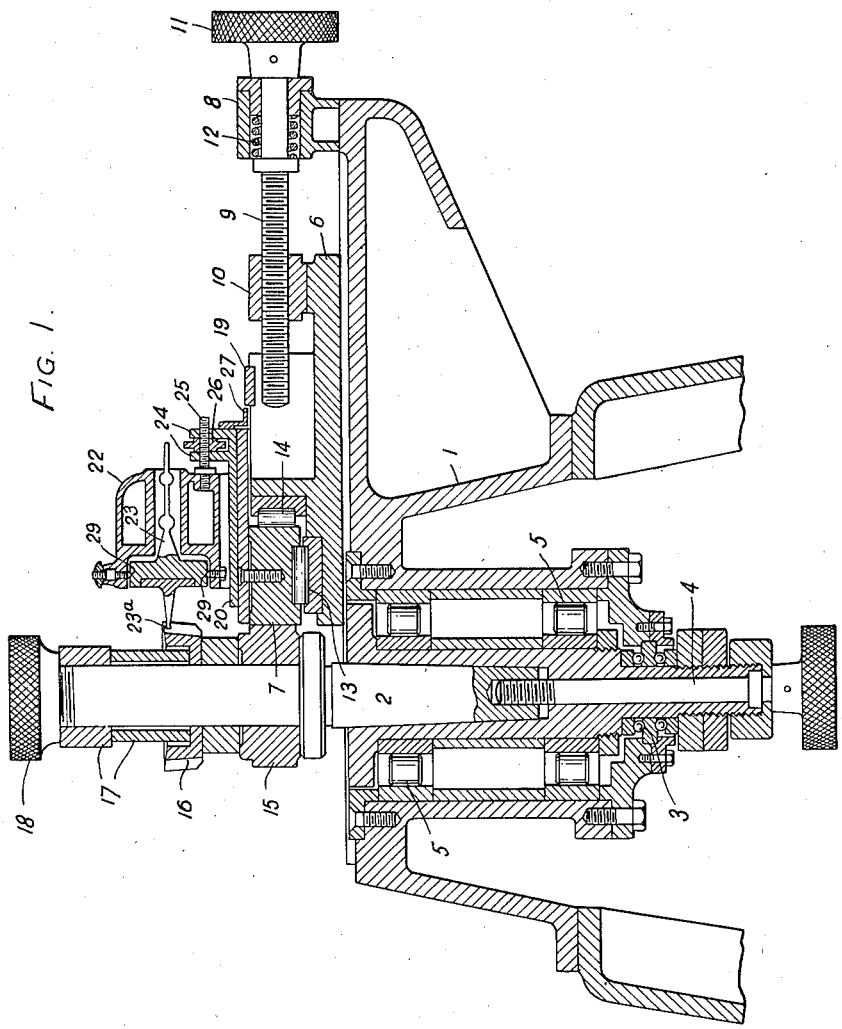
Inventor:
Walter Henry Try,
By his Attorneys,
Fraser, Myers & Manley.

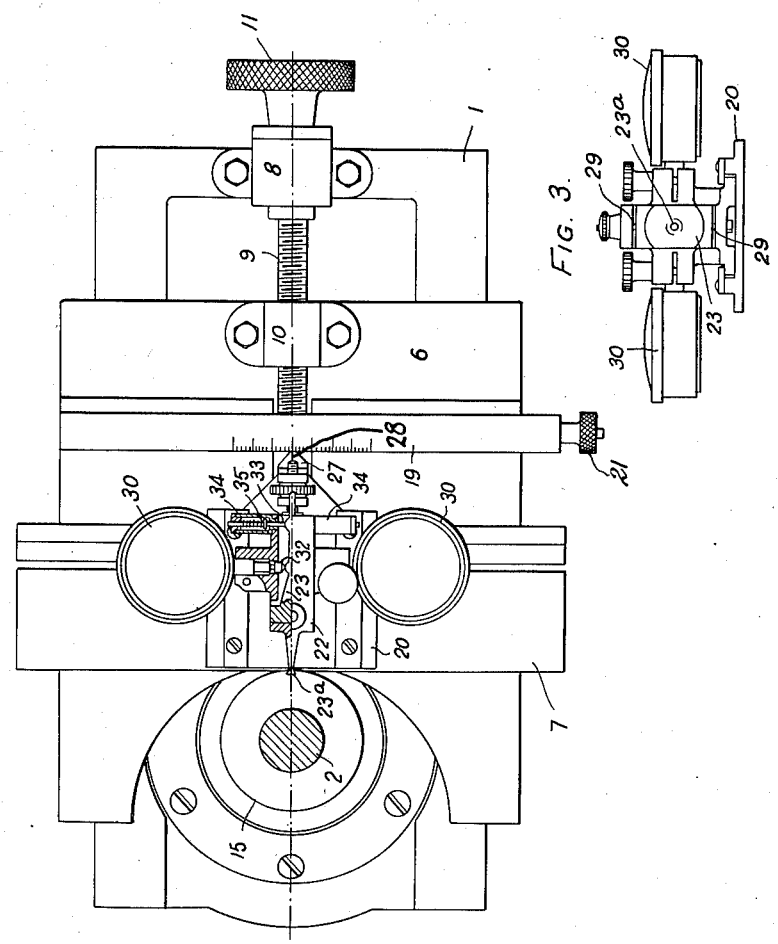

Patented Dec. 8, 1936

2,063,474

UNITED STATES PATENT OFFICE 2,063,474

APPARATUS FOR TESTING THE ACCURACY OF TOOTHED GEARS

Walter Henry Try, Staines, Middlesex, England, assignor to William Edwin Sykes, Buffalo, N. Y.

Application July 19, 1934, Serial No. 735,934
In Great Britain July 24, 1933

2 Claims. (Cl. 33—174)

This invention relates to improved apparatus for testing the accuracy of toothed gears. It is known to employ apparatus for this purpose in which a contact element supporting an indicating instrument is caused to roll over an annulus corresponding in diameter with the base circle of an involute gear to be tested and a tracing point or detector connected with the indicating instrument is caused to traverse the surface of a tooth on the gear so that the point is itself by the movement of the contact element moved over the same involute curve as that of the tooth and thus, if the tooth form is correct, no change in reading is shown on the indicating instrument.

In the known apparatus the gear was held stationary and the contact element and the indicating means with the tracing point were caused to move together with a comparatively large supporting structure, in a rotary direction about the axis of the cutter supporting member. The effort required to move this mass was comparatively great and its movement when effected manually was difficult to control so as to be smooth, particularly after the apparatus had been in use for some time. The readings given on the instrument were, in consequence, affected.

One object of this invention is to provide apparatus of the type referred to in which the effort required to produce the necessary relative movement between the contact element and the annulus is reduced to a minimum and thus to facilitate quick and accurate testing.

A further object of the invention is to provide sensitive means for indicating any errors in the tooth shape in which the return of the indicating means to its position of zero reading is ensured when the force causing a reading is removed.

By the construction in which the forces required to give the relative motion between the contact element and the annulus are reduced, the precise arrangement of the machine is preserved and the improved indicating means enable this feature to be utilized.

The apparatus according to the invention comprises a freely rotatable support for carrying the gear to be tested, on which support is fixed concentrically an annulus having rolling contact with a contact element carrying the indicating mechanism and a tracing point or detector, the contact element being slidably carried on a fixed support.

The construction according to the invention enables the contact element to be rolled over the perimeter of the annulus when the gear is rotated, or the gear to be rotated when the contact member is caused to slide on its support.

The invention will be described with reference to the accompanying drawings which show a machine constructed according to the invention and in which:—

Fig. 1 is a sectional elevation.

Fig. 2 is a plan of the machine, partly in section; and

Fig. 3 shows an end elevation of the indicating mechanism.

Referring to the drawings, a rigid base structure 1 carries a gear supporting spindle 2. Thrust bearings 3 and a spindle 4 in screw-threaded engagement with the spindle 2 ensure against longitudinal movement of the supporting spindle 2. Roller bearings 5 permit free rotation of the spindle 2 in the base 1. A slide 6, carried on the base 1, supports a contact element 7. On the base 1 is fixed a bearing 8 through which passes a shaft 9 in screw-threaded engagement with a nut 10 fixed to the slide 6. A knurled nut 11 is provided on the shaft 9 to permit ready adjustment of the slide 6 in a direction to or from the supporting spindle 2. A spring 12 exerts a thrust on the shaft 9 and takes up any back lash. The contact element 7 is slidably carried on the slide 6, roller bearings 13, 14 being provided to reduce friction between the element and the slide to a minimum. An annulus 15 is fixed on the spindle 2 and by the means described above the contact element formed with a straight edge is thrust resiliently against the annulus so that on rotation of the latter the element 7 slides on its support, rolling contact being obtained between the annulus and the element.

Above the annulus 15 the gear 16 to be tested is carried in such manner that the gear rotates with the spindle 2 and owing to the absence of longitudinal movement of the latter the detector to be described below is enabled to remain in the same diametral plane of the gear when passing over a tooth surface and when passing from one tooth to another.

This is particularly important when helical or spiral gears are tested. Bushes 17 serve to locate the gear in its proper position and a knurled nut 18 is provided to maintain it in this position. The slide 6 besides carrying the contact element 7 is also provided with a scale 19. A micrometer screw adjustment 21 of conventional form is provided to permit accurate positioning of the scale on the slide.

Fixed to the contact element, as, for instance by screws, is a base 20 and adjustably carried on this base is the indicating mechanism 22 and detector 23. Upstanding lugs 24 on the base serve as bearings for a rod 25 fixed to the indicating mechanism housing. The rod 25 is screw-threaded and rotation of a knurled nut 26 effects movement of the indicating mechanism along guide surfaces to the base so that the position of the detector 23 may be adjusted on the contact element towards or away from the spindle 2. A projection 27 is formed on the base 20 and a line mark 28 inscribed thereon. This mark 28, as will be described below, is employed in conjunction with the scale 19.

The detector 23 comprises an extended shank having at one end a hardened point 23a. The shank is pivotally supported for movement in one plane by point bearings 29 of diamond or other suitable material. The shank passes through the indicator mechanism housing on which are carried two laterally arranged indicators 30. Each indicator comprises a projecting element 32 which when displaced causes a change in reading of the indicator. The latter is of well-known type and need not now be described. In the construction illustrated in which two indicators 30 are employed both projecting elements 32 are in contact with the detector shank when the latter is centrally disposed. It will be appreciated that deviations of the shank from its central position, which deviations occur upon inaccuracies of the tooth shape when a test is made, result in a change in reading of one or other of the indicators. It will also be observed that the dimensions of the shank and the position of its pivoting point are selected to give displacements of the projecting elements of the desired dimensions.

In order to improve the sensitivity of the indicating mechanism two opposed forces are exerted on the end of the detector shank by compensating spring pressed plungers 33 carried in cylinders 34 mounted on the sides of the housing 22. Movement of the plungers towards the shank 23 is limited by a collar 35 on each plunger which abuts against a suitable stop. The inward movement of the plungers is stopped when their ends just make contact with the shank 23. Thus a movement of the shank in one direction compresses one of the compensating springs, the other exerting no force on the shank. When the shank returns to its normal position the loaded spring ensures its complete return and over-running is prevented by the action of the opposing plunger and its spring. This arrangement compensates for the effect of the friction of the shank bearings and increases the accuracy of the indicating mechanism.

It is, of course, essential that the point of contact of the detector be truly aligned and on the involute curve resulting from the annulus. The scale 19 permits the distance rolled by the contact element 7 on the annulus 15 to be read off and so make it possible to measure the accuracy of teeth in the shape of which departures from a true involute curve have been made at determined portions of its surface. The mechanism for this purpose is set with an involute master of known base diameter and known radius of a selected point on the tooth curve. The distance travelled by the contact element so that the tracing point may reach the selected point may be calculated from these values and indicated on the scale. The scale is set to zero and when shown by the indicator that the point has been reached this length is shown on the scale. When making tests it will be appreciated that the width of the detector "point" must be allowed for and when testing opposite faces of teeth that the scale must be readjusted to zero.

The arrangement described above enables the shape of both sides of gear teeth to be tested by merely displacing the detector from one side of the tooth space to the other without any rearrangement of the elements or reversal of the gear, other than setting the detector point or stylus on the curve as described.

I claim:—

1. Apparatus for testing the accuracy of gear teeth, which comprises a freely rotatable support for carrying the gear to be tested, an annulus fixed concentrically on the support, a contact element having rolling contact with the annulus, a detector adapted to make contact with a tooth of the gear to be tested, said detector being pivotally mounted to move in one plane and having a tail shank, an indicator adapted to be operated directly by the movement of the tail shank of the detector, and resilient means disposed so as to exert opposed forces on the tail shank for insuring the complete return of said shank to its normal position and preventing the overrunning of such return after the detector has been displaced to operate the indicator.

2. Apparatus according to claim 1, wherein the resilient means disposed so as to exert opposed forces on the tail shank consist of spring-pressed plungers mounted in housings, said plungers and housings having cooperating means for limiting the inward movement of the ends of the plungers to where they just make contact with the tail shank when it is in its normal position.

WALTER HENRY TRY.